United States Patent
Ginetti et al.

(10) Patent No.: US 10,872,192 B1
(45) Date of Patent: Dec. 22, 2020

(54) METHODS, SYSTEMS, AND COMPUTER PROGRAM PRODUCT FOR REDUCING INTERFERENCES AND DISTURBANCES IN A MULTI-FABRIC ELECTRONIC DESIGN

(71) Applicant: Cadence Design Systems, Inc., San Jose, CA (US)

(72) Inventors: Arnold Jean Marie Gustave Ginetti, Antibes (FR); Jean-Noel Pic, Valbonne (FR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/157,001

(22) Filed: Oct. 10, 2018

(51) Int. Cl.
*G06F 17/50* (2006.01)
*G06F 30/398* (2020.01)
*G06F 111/02* (2020.01)
*G06F 111/20* (2020.01)
*G06F 113/18* (2020.01)

(52) U.S. Cl.
CPC ........ *G06F 30/398* (2020.01); *G06F 2111/02* (2020.01); *G06F 2111/20* (2020.01); *G06F 2113/18* (2020.01)

(58) Field of Classification Search
CPC ............. G06F 17/5081; G06F 2217/04; G06F 2217/02; G06F 2217/40
USPC .... 716/3–107, 110–112, 115, 118–119, 126, 716/129–130, 132, 139
See application file for complete search history.

(56) References Cited

U.S. PATENT DOCUMENTS

| | | | |
|---|---|---|---|
| 4,457,027 A | 7/1984 | Gladstone | |
| 6,397,370 B1 | 5/2002 | Fernandez | |
| 6,748,572 B2 * | 6/2004 | Fujine | G06F 17/5036 702/64 |
| 7,257,799 B2 | 8/2007 | McKenney | |
| 7,318,207 B2 * | 1/2008 | Takabe | G06F 17/5022 703/2 |
| 7,468,982 B2 | 12/2008 | Mehra | |
| 7,555,739 B1 | 6/2009 | Ginetti | |
| 7,779,286 B1 | 8/2010 | Pritchard | |
| 7,802,221 B1 | 9/2010 | Brink | |
| 8,136,071 B2 | 3/2012 | Solomon | |
| 8,191,035 B1 | 5/2012 | Van Brink | |
| 8,286,025 B1 | 10/2012 | Pritchard | |
| 8,930,878 B1 | 1/2015 | Leef | |

(Continued)

OTHER PUBLICATIONS

Non-Final Office Action dated Nov. 8, 2019 for U.S. Appl. No. 16/157,011.

(Continued)

*Primary Examiner* — Nghia M Doan
(74) *Attorney, Agent, or Firm* — Vista IP Law Group, LLP

(57) ABSTRACT

Disclosed are methods, systems, and articles of manufacture for reducing interferences and disturbances in a multi-fabric electronic design. These techniques identify connectivity for an electronic design that includes design data in multiple design fabrics. One or more interference modules are executed to detect a loop in the electronic design with at least the connectivity. These techniques further execute the one or more interference reduction modules to determine at least one critical circuit component upon which the loop exerts a negative impact. One or more remedial actions are then triggered to reduce or eliminate the negative impact on the critical circuit component design.

20 Claims, 12 Drawing Sheets

(56) References Cited

U.S. PATENT DOCUMENTS

| | | |
|---|---|---|
| 9,092,586 B1 | 7/2015 | Ginetti |
| 9,129,081 B2 | 9/2015 | Ginetti |
| 9,141,746 B1 | 9/2015 | Ginetti |
| 9,208,273 B1 | 12/2015 | Morlat |
| 9,223,915 B1 | 12/2015 | Ginetti |
| 9,286,421 B1 * | 3/2016 | Kukal ................ G06F 17/5022 |
| 9,348,960 B1 * | 5/2016 | Ginetti ................... G06F 30/20 |
| 9,361,415 B1 | 6/2016 | Ginetti et al. |
| 9,542,084 B1 | 1/2017 | Colancon |
| 9,684,748 B1 | 6/2017 | Badel |
| 9,761,204 B1 | 9/2017 | Ginetti |
| 9,773,082 B1 | 9/2017 | Morlat |
| 9,830,417 B1 | 11/2017 | Ginetti |
| 9,842,183 B1 | 12/2017 | Ginetti |
| 10,331,841 B1 | 6/2019 | Ginetti |
| 10,467,370 B1 * | 11/2019 | Kukal ................ H05K 3/0005 |
| 10,496,772 B1 | 12/2019 | Ginetti |
| 2004/0156322 A1 | 8/2004 | Mehra |
| 2008/0313581 A1 | 12/2008 | Gernhoefer |
| 2010/0205575 A1 | 8/2010 | Arora |
| 2011/0049722 A1 * | 3/2011 | Sun ....................... H01L 23/528 257/773 |
| 2013/0097572 A1 | 4/2013 | Ginetti et al. |
| 2016/0070841 A1 * | 3/2016 | Salowe ............... G06F 17/5077 716/112 |
| 2016/0147908 A1 | 5/2016 | Ni |

OTHER PUBLICATIONS

Non-Final Office Action dated Nov. 6, 2019 for U.S. Appl. No. 16/157,005.
Notice of Allowance dated Feb. 9, 2016 for U.S. Appl. No. 14/503,403.
Ex Parte Quayle dated Nov. 27, 2015 for U.S. Appl. No. 14/503,403.
Notice of Allowance dated Aug. 5, 2020 for U.S. Appl. No. 16/157,005.
Final Office Action dated Apr. 9, 2020 for U.S. Appl. No. 16/157,005.
Notice of Allowance dated May 7, 2020 for U.S. Appl. No. 16/157,011.

* cited by examiner

METHODS, SYSTEMS, AND COMPUTER PROGRAM PRODUCT FOR REDUCING INTERFERENCES AND DISTURBANCES IN A MULTI-FABRIC ELECTRONIC DESIGN

CROSS REFERENCE TO RELATED APPLICATIONS

This application is also related to U.S. patent application Ser. No. 16/157,011 filed on concurrently and entitled "METHODS, SYSTEMS, AND COMPUTER PROGRAM PRODUCT FOR DETERMINING LAYOUT EQUIVALENCE FOR A MULTI-FABRIC ELECTRONIC DESIGN", and U.S. patent application Ser. No. 16/157,005 filed on concurrently and entitled "METHODS, SYSTEMS, AND COMPUTER PROGRAM PRODUCT FOR INTERACTIVELY PROBING A MULTI-FABRIC ELECTRONIC DESIGN". This application is also related to U.S. patent application Ser. No. 14/503,404 filed on Oct. 1, 2014 and entitled "METHOD, SYSTEM, AND COMPUTER PROGRAM PRODUCT FOR IMPLEMENTING A MULTI-FABRIC ELECTRONIC DESIGN SPANNING ACROSS MULTIPLE DESIGN FABRICS". The contents of the aforementioned U.S. patent applications are hereby incorporated by reference in their respective entireties for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In conventional electronic designs, the integrated circuits, the IC (integrated circuit) packaging, and the printed circuit boards are often developed and designed independently. Modern electronic designs often require or desire developing the integrated circuit, the their respective packaging, and the printed circuit board incorporating multiple packaged integrated circuits in a multi-fabric environment. That is, one designer may need or desire to design in the context of the others. For example, the integrated circuit designer may need or desire to implement the integrated circuit design in view of the contexts of the packaging fabric as well as the printed circuit board fabric.

Similarly, a printed circuit board designer may need or desire to implement or tune the printed circuit design in the context of the packaging design fabric and/or the integrated circuit design fabric. As a practical example where an advanced package is to be incorporated onto a PCB for a consumer product that is driven by cost considerations and performance. In conventional approaches, while device placement and assignment decisions made solely in the context of the chip may yield the ideal chip-level design, these device placement and assignment decisions could nevertheless result in missing the cost or performance goals for the end consumer product. In these convention approaches, the chip-level placement usually dictates, for example, the bump and ball assignments in the downstream fabrics that may result in excessive coupling in, for example, the interfaces and a complex routing scheme that requires additional layers in the package and/or PCB substrates.

Interferences and disturbances such as electromagnetic interference (EMI), intersymbol interferences (ISI), simultaneous switching noise (SSN), etc. may adversely affect the performance of an electronic design. Conventional approaches use electromagnetic analyses (EM analyses) that solve the Maxwell equation with the geometric information (e.g., sizes, locations, etc.) from the layout and electrical information of an electronic design to determine whether the interferences are sufficiently strong so that the electronic design will not behave correctly as designed. If interferences are determined to be sufficiently strong the design may undergo modifications to conform the electronic design to the specification.

Conventional approaches for EM analyses model the geometries of electronic design with relatively high precision because the geometric shapes of components or voids may significantly affect the accuracy of EM analyses. For example, an EM analysis may desire to model a circular or curved geometric entity (e.g., a hole in a printed circuit board, a via between two adjacent layers in an integrated circuit, a geometric shape with a curved boundary, etc.) with perfect circular or curved geometries in an ideal situation. Nonetheless, such ideal situation if often impractical, if not impossible, for numerical methods. As a result, conventional approaches approximate such circular or curved geometries in a layout with polygonal geometric entities (e.g., piecewise linear segments).

Such conventional approaches may be suitable for small-scale EM analyses, but their performance deteriorates as the size of the electronic circuit increases. For example, such conventional approaches either take prohibitively long time to obtain a solution or are completely stalled for a full-chip EM analyses unless the integrated circuit to be analyzed contains only a limited number of components. Yet, modern integrated circuits often contains hundreds of millions of transistors. Conventional 3D EM approaches simply cannot accommodate such a complex model, regardless of the computational capacity of the computers used for 3D EM analyses. Other conventional approaches try to conquer such problems by adopting pseudo-3D or 2.5-D approaches where certain geometries are modeled as 2D shapes with thickness information (e.g., modeling a via as a 2D hexagonal shape associated with the extruded height information), rather than pure 3D shapes. These pseudo-3D or 2.5-D approaches may perform 3D EM analyses with long yet acceptable runtime on power computing systems.

Nonetheless, in modern electronic designs that involve co-design or co-editing of, for example, the package layout and the IC layout, the PCB layout together with the package layout and the IC layout, all of these conventional approaches for 3D, pseudo-3D, or 2.5D EM analyses simply cannot cope with the scale differences among the PCB, the package layout, and the integrated circuit. For example, interconnects may have the widths of hundreds or thousands of microns and may thus be visible with bare eyes on a printed circuit board; and package tabs may and their respective interconnects in a package layout may have the widths of hundreds or thousands of microns and may thus be visible with bare eyes.

In addition, a resistor or capacitor may have the sizes of several millimeters on a printed circuit board. Nonetheless, interconnects in an integrated circuit design may be only a few nanometers wide. In a co-design or co-editing implementation flow, no modern computers or numerical methods can accommodate the scale differences in circuit components exhibiting such a wide range of sizes. For example, no meshing or discretizing methodologies can successfully generate a workable set of meshes for subsequent analyses without crashing the computing systems. This inability to predict the behaviors of an electronic circuit prior to sending the final design for the expansive fabrication process causes a big problem and potential waste of invaluable chip area on silicon because there is no guarantee that an electronic design will perform as designed, and the electronic design is thus not viable.

Thus, there is a need for methods, systems, and computer program products for reducing interferences and disturbances in a multi-fabric electronic design to address at least the aforementioned issues and shortcomings. It shall be noted that some of the approaches described in this Background section constitute approaches that may be pursued, but not necessarily approaches that have been previously conceived or pursued. Therefore, unless otherwise explicitly stated, it shall not be assumed that any of such approaches described in this section quality as prior art merely by virtue of their inclusion in this section.

SUMMARY

Disclosed are method(s), system(s), and article(s) of manufacture for reducing interferences and disturbances in a multi-fabric electronic design in one or more embodiments. Some embodiments are directed at a method for binding and annotating an electronic design with a schematic driven extracted view.

In some embodiments, connectivity may be identified for an electronic design that includes design data in multiple design fabrics; one or more interference reduction modules that are stored at least partially in memory of and function in conjunction with at least one microprocessor of a computing system may be executed to detect a loop in the electronic design with at least the connectivity; these one or more interference reduction modules may be further executed to determine at least one critical circuit component upon which the loop exerts a negative impact; and one or more remedial actions may be triggered to reduce or eliminate the negative impact on the critical circuit component design.

In some embodiments, a net of a plurality of nets may be identified in the electronic design with at least the connectivity; and one or more additional circuit components connected to the net may be further identified. In some of these embodiments, topology information of the net may be determined at least by using the design data of the net and the one or more additional circuit components. Furthermore, geometric or location data may be identified from the design data of the design data of the net and the one or more additional circuit components; and spatial relations among the net and the one or more additional circuit components may also be determined.

Some of these embodiments of the present invention determine whether the topology indicates existence of the loop by performing one or more logical operations on one or more net segments of the net and the one or more additional circuit components; and upon a determination of the existence of the loop, these embodiments further determine a type of the loop, wherein types of loops include electrically closed, electrically open with a gap smaller than a threshold value, and electrically open with the gap larger than the threshold value.

In some of these embodiments, a data structure may be identified or generated for one or more types of circuit components; and one or more first circuit components in the electronic design may be identified based at least in part upon the topology information. In addition or in the alternative, the data structure may be pre-filtered by using one or more pre-filters based in part or in whole upon the topology information. Moreover, a criticality index of a first circuit component of the one or more first circuit components may be determined based at least in part upon a relationship between the first circuit component and the loop.

Some of the immediately preceding embodiments determine whether the first circuit component is classified as the at least one critical circuit component based at least in part upon the critical index. In addition or in the alternative, the at least one critical circuit component may be labeled with a marker based at least in part upon the criticality index and the relationship between the first circuit component and the loop.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
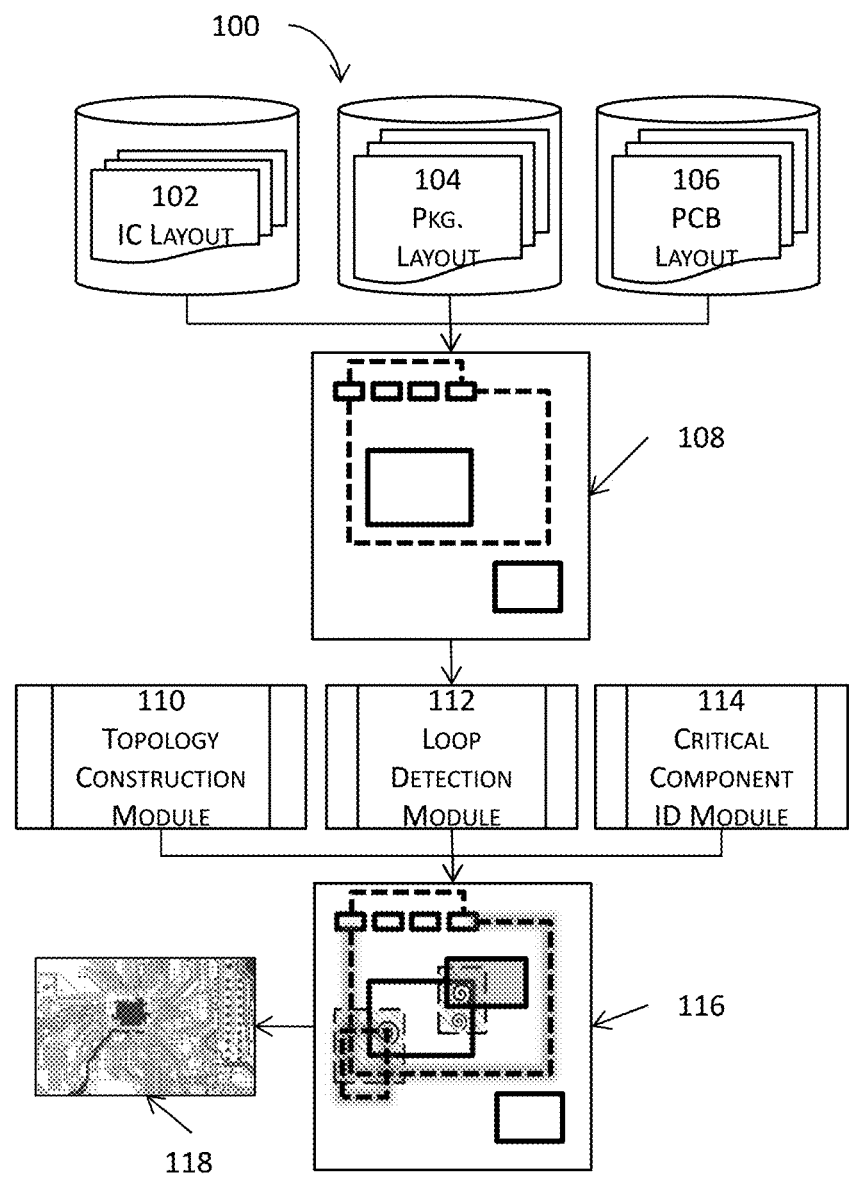
FIG. 1 illustrates a high level block diagram of a simplified system for reducing interferences and disturbances in a multi-fabric electronic design in one or more embodiments.

Various techniques are directed to reducing interferences and disturbances in a multi-fabric electronic design in various embodiments. In these embodiments, the present invention expediently and efficiently identifies critical components in an electronic design that either cause the underlying electronic design not to function as designed or exhibit probable or possible negative effects that require more detailed analyses. In some embodiments, the present invention identifies a loop in a multi-fabric electronic design comprising, for example, an integrated circuit (IC) design and one or more of an IC package design (e.g., an IC package layout), a printed circuit board (PCB) design (e.g., a PCB layout), a computing system enclosed within an enclosure, a rack (e.g., a server rack) of multiple computing systems, or a plurality of racks.

A loop may be identified from the electronic design by using, for example, connectivity (e.g., schematic connectivity, layout connectivity, or a combination of schematic connectivity and layout connectivity with information binding the schematic connectivity and layout connectivity together), one or more schematic designs corresponding to the electronic design, one or more physical layouts corresponding to the electronic design, and/or any other mapping or correlation indicative of the correspondence or correlation between schematic design components and respective layout components between the schematic design(s) and the corresponding layout(s). In some embodiments, a loop may be identified by traversing the connectivity or netlist (e.g., schematic and/or layout netlist) to identify connected net segments and further by executing a process to determine whether the connected net segments form a loop or almost a loop (e.g., a loop that is not entire connected and has a sufficiently small gap along the net segments). For example, the present invention may execute a Boolean hole algorithm to determine whether the connected segments form a loop or almost a loop.

With a loop identified, the present invention determines whether the identified loop encloses or overlaps one or more circuit components whose performance or behavior may be affected by the identified loop. In some embodiments, the present invention may search for whether the identified loop encloses, overlaps, or is within sufficient proximity (defined by a default or customizable threshold proximity value) of one or more inductors. For example, the present invention may query a database (e.g., a schematic and/or a layout database) by using a name or part of a name (e.g., "inductor*" where * indicates a wildcard search for any terms beginning with "inductor"), a function, a property (e.g., inductance), other suitable predicates, or any combinations thereof. In some of these embodiments, the query may further narrow the scope of search by confining the query within a boundary (e.g., the boundary defined by the identified loop) to identify any circuit components whose behavior may be affected by the identified loop under, for example, Ampere's law.

When a circuit component whose behavior may be affected by the identified loop is identified, the present invention may further predict the level of impact of the identified loop on the circuit component. The present invention may automatically trigger the generation and transmission of an electronic message to report the finding of such a loop and circuit component to a designer's computing system. The present invention may display one or more warnings or hints with graphical and/or textual highlight in a window (e.g., a pop-up window) and/or may graphically emphasize the loop and the circuit component. The present invention may further link the identified circuit component with the identified loop by artificially creating a graphical link between the identified circuit component with the identified loop in a design window.

In some embodiments where the predicted level of impact may be significant, the present invention may invoke one or more editors (e.g., a layout editor) and emphasize the identified loop and circuit component so that the designer may modify the electronic design to resolve the impact. For example, if the loop fully encloses an inductor, a layout editor may be automatically invoked with the corresponding circuit components for the loop and the enclosed circuit component emphasized and provide description of the predicted impact and/or recommended remedial actions so that a designer may modify the electronic design to resolve the predicted, significant impact.

In some other embodiments where the predicted level of impact or the types of interactions between the identified loop and circuit component do not necessarily rise to the level of a significant impact, the present invention may carve out a smaller portion including at least a portion of the loop and at least a portion of the identified circuit component in the electronic design, obtain the geometries of the smaller portion, and send the geometries, some information or input about the predicted impact between the identified circuit component with the identified loop (e.g., material properties, electric characteristics such as current values, voltage values, etc., parasitics, etc.), or any other required or desired information to an EM engine that automatically performs one or more EM analyses to more precisely and accurately characterize the impact between the identified circuit component with the identified loop.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention.

Further, various embodiments encompass present and future known equivalents to the components referred to herein by way of illustration. Moreover, it shall also be noted that the figures are intended only to facilitate the description of the disclosed embodiments and/or examples but are not representative of an exhaustive treatment of all possible embodiments and/or examples and are not intended to impute any limitations as to the scope of the claims, embodiments, and/or examples. In addition, any figures or their corresponding description need not necessarily portray all aspects or advantages in any particular environment. Any aspect or advantage described in conjunction with a particular embodiment and/or example is not necessarily limited to that embodiment and/or example and can be practiced in any other embodiments and/or examples even if not so illustrated. References throughout this specification to "some embodiments" or "other embodiments" refer to a particular feature, structure, material or characteristic described in connection with the embodiments as being included in at least one embodiment. Thus, the recitation of the phrases "in some embodiments" or "in other embodiments" in various places throughout this specification is not necessarily referring to the same embodiment or embodiments. The disclosed embodiments are not intended to be limiting of the claims.

In addition, unless otherwise explicitly stated, the recitation of the phrases "in some embodiments" or "in other embodiments" in this specification does not necessarily mean any of the features, advantages, aspects, etc. described "in some embodiments" do not or cannot be combined with any of the other features, advantages, aspects, etc. described "in other embodiments". Thus, any features, advantages, aspects, etc. described in this specification can be combined and can function in conjunction with each other, unless otherwise explicitly stated or recited.

FIG. 1 illustrates a high level block diagram of a simplified system for reducing interferences and disturbances in a multi-fabric electronic design in one or more embodiments. More specifically, a multi-fabric layout 108 may be identified from, for example, the memory or one or more storage devices. For example, a layout session of an EDA layout tool may open an IC (integrated circuits) package layout 104 or a PCB (printed circuit board) layout 106. The multi-fabric electronic design spans across multiple design hierarchies. For example, a PCB layout includes circuit components in the PCB design fabric, the IC package design fabric, and the IC design fabric. Hierarchically, the PCB design fabric includes the IC package design fabric which, in turn, includes the IC design fabric. For example, a PCB layout may include a plurality of IC packages, and each IC package includes one or more ICs. It shall be noted that these design fabrics are provided herein for the ease of illustration and description, and that other design fabrics are also contemplated.

One or more computing systems may invoke and execute a plurality of modules, which are specifically programmed and stored at least partially in memory of and functions in conjunction with at least one microprocessor or processor core of the one or more computing systems, to perform various functions to transform the identified multi-fabric electronic design 108 into a transformed multi-fabric electronic design 116. For example, the one or more computing systems may identify connectivity of the multi-fabric electronic design and execute a topology construction module (110) to construct the topology of one or more nets and connected circuit components in a single design fabric or across multiple design fabrics. The present invention may then cause the occurrence of manufacturing or fabrication of the underlying electronic circuit 118 at least by forwarding a final version (e.g., a signed-off version) of the electronic design to fabrication equipment (e.g., photomask manufacturing equipment, lithographic equipment, etc.)

This topology may then be provided to a loop detection module (112) that may perform one or more algorithms (e.g., a logical Boolean hole algorithm) to determine the one or more nets and connected circuit components form a loop. Once a loop is identified, the one or more computing systems may further execute a critical component identification module to determine whether one or more circuit components (e.g., inductor(s), circuit component(s) in antenna section(s), high-frequency component(s), etc.) are significantly affected by the identified loop.

With the critical circuit components identified, the one or more computing systems may annotate the electronic design. For example, the identified loops and corresponding critical circuit components may be graphically and/or textually emphasized in the display window of a user interface. As another example, a link may be generated between a critical circuit component and the loop that adversely affects the critical circuit component. In addition or in the alternative, a design browser comprising the hierarchical or tree structure of the electronic design and respective circuit components may also be graphically and/or textually emphasized.

Moreover, the one or more computing systems may automatically perform various actions in response to the detection of loop(s) and critical circuit component(s). for example, the one or more computing systems may automatically generate and transmit a warning message to indicate that certain critical circuit components are fully enclosed by a loop, and that a design change may be needed. The warning may also include recommendation of design change and more detailed information about the loop, its constituents (e.g., net segments, circuit components, etc. and layers (e.g., metal-5 layer), design fabrics (e.g., PCB, IC package, IC, etc.), etc. that pertains to the net segments, circuit components, etc.)

As another example, the one or more computing systems may carve out at least a portion of the multi-fabric electronic design in the vicinity of the loop and a critical circuit component, extract the geometries (across multiple design fabrics if necessary), generate a 3D or pseudo-3D model with at least these geometries, forward the 3D or pseudo-3D model to an analysis module 502 (e.g., a 3D or pseudo-3D electromagnetic simulation module), and performs one or more analyses to more precisely and accurately determine the impact of the identified loop on the critical circuit component. The predicted or determined behavior of the electronic design is then classified according to, for example, its deviation from the corresponding specification and may be provided to a designer for further consideration of whether the electronic design is to be modified. More details about various aspects of the system for reducing interferences and disturbances in a multi-fabric electronic design will be described below with reference to FIGS. 2-5.

Figure 2:
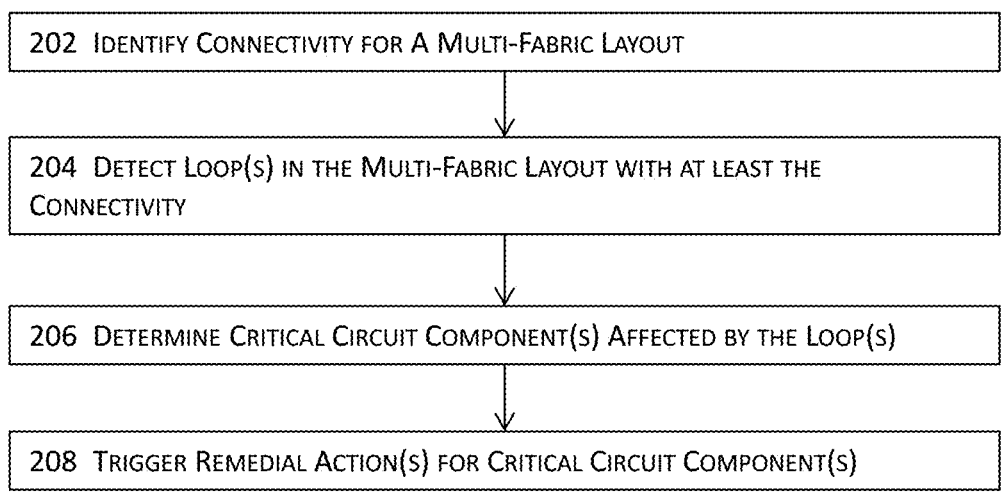
FIG. 2 illustrates a high level block diagram for reducing interferences and disturbances in a multi-fabric electronic design in one or more embodiments.

FIG. 2 illustrates a high level block diagram for reducing interferences and disturbances in a multi-fabric electronic design in one or more embodiments. In these embodiments, an multi-fabric electronic design (e.g., a multi-fabric layout spanning across multiple design fabrics) and connectivity may be identified at 202. The connectivity identified at 202 may include, for example, schematic connectivity and/or layout connectivity. In some embodiments, the schematic designs (e.g., PCB schematic, IC package schematic, IC schematic) and the physical designs (e.g., PCB layout, IC package layout, IC layout) of the multi-fabric electronic design are bound by one or more binding modules so that the identification of one circuit component can be efficiently and expediently looked up by using the cross-references.

A loop may be detected at 204 in the multi-fabric electronic design with at least the connectivity identified at 204. A loop may include, for example, one or more nets, each having one or more net segments. These one or more nets may be located in a single design fabric or across multiple design fabrics. A loop may also include circuit components (e.g., discrete circuit components, instances, cells, blocks, etc.) that are electrically connected to the one or more nets. It shall be noted that a loop may be electrically closed or electrically open.

A fully closed loop comprises one in which the net segment(s) and the connected circuit component(s) form a pathway for electricity (e.g., electric current) to flow through so that when the loop is energized, an induced electromagnetic field is generated as controlled by the Ampere's Law. An electrically open loop includes one where the net segment(s) and the connected circuit component(s) include a gap so as not to form a pathway for electricity to flow through. Nevertheless, the gap is sufficiently small than a threshold so that when the open loop is energized, the aggregated electromagnetic field generated around, for example, the net segment(s) exerts sufficiently strong influence on another circuit component (e.g., an inductor) in the multi-fabric electronic design. This threshold may be characterized so that various embodiments described herein may be characterized or pre-characterized based at least in part upon, for example, distortion, sensitivity, and/or severity of a circuit component to interferences with respect to the strength of interferences or disturbances, the type (e.g., serial interface, parallel interface, etc.) of interface to which the circuit component belongs, or any other suitable factors. More details about loop detection will be described below with reference to FIG. 3A.

One or more critical circuit components may be determined at 206. Some embodiments determines a circuit component as a critical circuit component based in part or in whole upon the relationship between the circuit component and the loop identified at 204. For example, when the circuit component and the identified loop are projected on the same plane, and the projected loop fully encloses the projected circuit component, these embodiments may further determine whether the circuit component is within a threshold distance from the identified an electrically conductive surface (e.g., a ground plane or a power plane such as a Vss plane) in between to shield off the interferences. If the determination result is affirmative, the circuit component may be determined to be a critical component in some embodiments.

In some embodiments where the projected identified loop overlaps the projected circuit component, these embodiments may further determine whether the circuit component is within a threshold distance from the identified loop without a ground plane or Vss plane in between. If the determination result is affirmative, the circuit component may also be determined to be a critical component. In some embodiments where the projected identified loop does not enclose or overlap the projected circuit component, but the these embodiments may further determine whether the circuit component is within a threshold distance from the identified loop without an electrically conductive surface (e.g., a ground plane or a power plane such as a Vss plane) in between to shield off the interferences. If the determination result is affirmative, the circuit component may also be determined to be a critical component. Critical components may be categorized into a plurality of levels according to, for example, their respective susceptibility to interferences or disturbances. More details about critical circuit component determination are described below with reference to FIG. 3B.

With the loop identified at 204 and one or more critical components identified at 206, one or more corresponding remedial actions may be automatically triggered at 208. In some embodiments, remedial actions may be determined based at least in part upon, for example, the criticality index indicative of the criticality or types of a critical component and its relation (e.g., spatial relation) with the identified loop. A criticality index may have a numerical criticality value where larger criticality values indicate that the corresponding circuit component is more critical. A criticality index may have symbolic or semantic representations such as "high," "medium," and "low" or different color codes (e.g., red indicating critical, yellow indicating medium criticality, and green indicating non-critical). Remedial actions may include, for example, notifications to recommend redesign or modification of the pertinent portion of the electronic design, notifications to recommend further analyses (e.g., one or more electromagnetic analyses), automatic invocation of an analysis engine and performance of one or more analyses, etc.

Figure 3A:
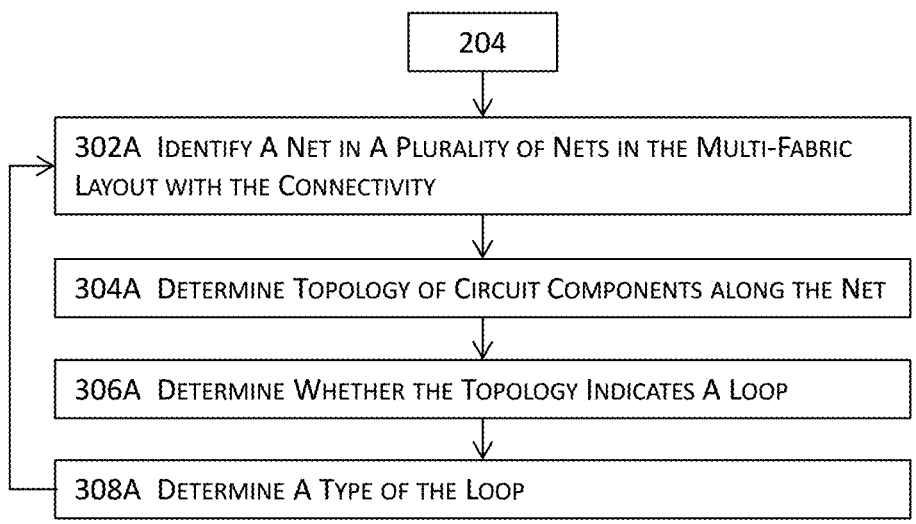
FIGS. 3A-3B illustrate more details about a portion of the high level block diagram illustrated in FIG. 2 in one or more embodiments.
Figure 3B:
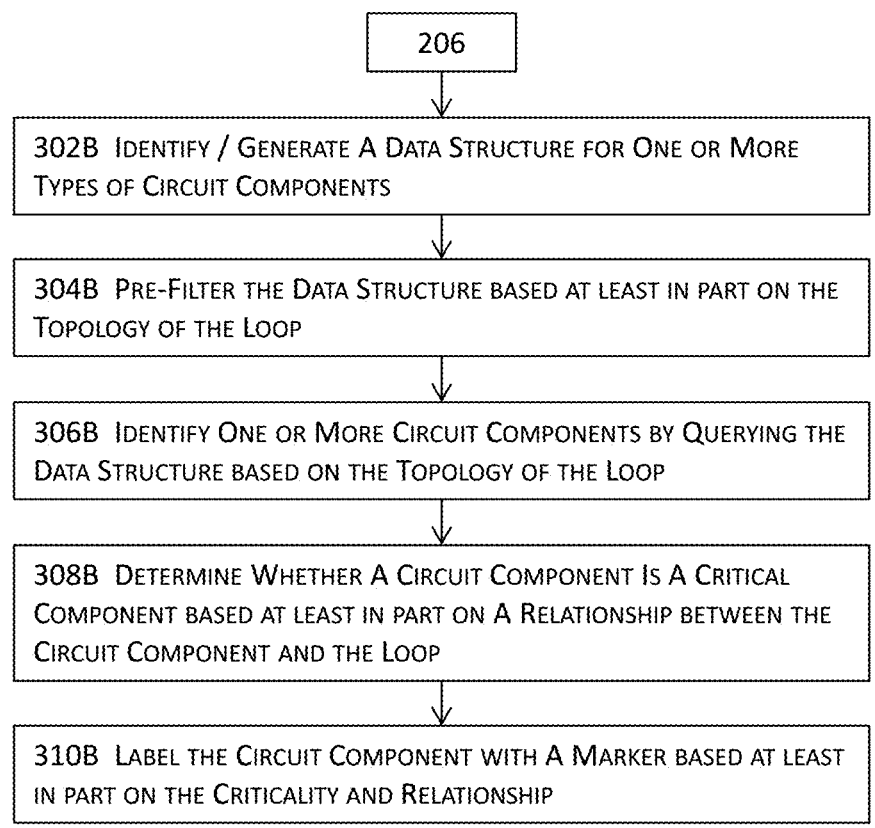

FIGS. 3A-3B illustrate more details about a portion of the high level block diagram illustrated in FIG. 2 in one or more embodiments. More specifically, FIG. 3A illustrates more details about loop detection (204) of FIG. 2. In some embodiments, a net may be identified at 302A from a plurality of nets in the multi-fabric electronic design. For example, the net may be identified from the netlist or connectivity of the multiple design fabrics. Circuit components connected to the net may also be identified at 302A.

The topology of the identified net may be determined or constructed at 304A. The topology of the identified net includes the exact or approximate geometric, positional, and/or spatial relations or characteristics of the net and circuit components connected to the net. In some embodiments, although a net segment or a circuit component is a three-dimensional (3D) shape, its contribution to the topology of the net may be determined by the planar (in-plane) dimensions, and the vertical (out-of-plane) dimension may be ignored in the construction of the construction of the topology but referenced in the spatial relation to circuit components in determining the criticality of the circuit components. Ignoring the vertical dimension may provide sufficient accuracy while conserving computational resources in determining a loop and/or critical circuit components because whether a loop encloses or overlaps a circuit component may be determined by projecting the net topology and the circuit component onto a plane. In some other embodiments, the net topology may be determined exactly in the three-dimensional space to further enhance the accuracy of the identification of loops and determination of critical components.

At 306A, whether the net topology determined at 304A forms a loop. In some embodiments, this determination may be done by performing a logical Boolean hole algorithm or any other algorithms that determines whether the topology forms a hole. The logical Boolean hole algorithm is used to find a hole within a bigger shape. If the determination result is affirmative, the topology is then determined to indicate the existence of a loop. In some embodiments, a loop may be determined at 304A by simply determining whether the beginning point of the loop coincides (for an electrically closed loop) or is sufficiently close (for an electrically open loop) to the end point of the net topology.

At 308A where it is determined that the net and the connected circuit components form a loop, the type of the loop may be further determined. Loops may be categorized into respective types. Types of loops may include, for example, electrically closed, nearly electrically closed (e.g., the opening in the projected topology is sufficiently smaller than a threshold distance), electrically open (e.g., the opening in the projected topology is sufficiently large than a threshold distance so as not to exhibit significant interferences or disturbances), etc. With the net processed in 304A-308A, the process may return to 302A to identify the next net and repeat 304A-308A until all the nets in the netlist or the nets that need to be processed are processed.

FIG. 3B illustrates more details about critical circuit component determination (206) of FIG. 2. In some embodiments, a data structure may be identified (if pre-existing) or generated (if non-existing) at 302B. The data structure may include information of one or more types of circuit components. For example, the data structure may include information of critical circuit components (e.g., inductors, circuit components in antenna section(s), high-frequency circuit components, etc.) that may be more susceptible to interferences or disturbances. In some embodiments, the data structure may include, for example, the schematic database, a copy of the schematic database, or an augmented version thereof (e.g., a copy of a schematic database with geometric or positioning information).

Data in the data structure identified or generated at 302B may be optionally pre-filtered during the determination of critical components at 304B to reduce the search space of critical components. The data structure may include spatial geometric and/or positional information (e.g., coordinates, locations, orientations, etc.) of circuit components that may be more susceptible to interferences or disturbances. The data structure may be a two-dimensional data structure (e.g., the data structure illustrated in FIG. 3C), a three-dimension data structure including information about the three-dimensional positions of such circuit components, or a high-dimensional data structure that includes four or more dimensions.

In some embodiments, a circuit component (e.g., a critical circuit component or any circuit component of interest) may be identified or determined at 306B based at least in part upon the topology of a loop. For example, a circuit component may be identified when the projected topology of the identified loop (e.g., projecting the identified loop onto a plane) encloses or overlaps the projected circuit component, or when the projected topology of the identified loop is sufficiently close to the projected circuit component, although the identified loop and the identified circuit component may or may not necessarily be on the same layer or in the same design fabric. In these embodiments, one or more custom filters may be determined on the fly with respect to the identified loop. For example, the first bound in the X-direction and the second bound in the Y-direction may be determined. The third bound in the Z-direction may also be determined from the identified loop and a range of influence beyond which interferences or disturbances caused by electricity running in the identified loop may be ignored. The smallest of these three bounds may be first used to custom define a filtering criterion to filter out circuit components whose corresponding spatial information falls outside of the filtering criterion.

A determination of whether a circuit component constitutes a critical circuit component may be made at 308B based at least in part upon a relationship between an identified circuit component and the identified loop. In the aforementioned example of custom filters, the third bound (in the out-of-plane direction) may be determined to be 100 um from the identified loop. In this example, a custom filter may be devised to be 100 um above and 100 um below the identified loop. The application of this custom filter will remove circuit components whose Z-coordinates fall outside of this 200 um range from further processing and consideration.

If the application of this third filter removes all circuit components from further processing or consideration, the process may proceed to identify the next loop and/or the next circuit component for similar processing in some embodiments. In some embodiments where one or more circuit components remain to be considered after the application of a filter, a different type of filter may be pre-generated or constructed on the fly and applied to the remaining circuit components to further filter out additional circuit components, if applicable. On the other hand, if the applications of all of the filters (either sequentially or all at once) removes all of the circuit components in the data structure, the identified loop may thus be identified as a no-harm or don't-care loop in some embodiments.

The critical circuit component identified at 308B may be labeled, marked, or identified at 3106 with a marker or other identification based at least in part or in whole upon, for example, the criticality of the critical circuit component relative to the identified loop. Such a marker may include a graphical (e.g., different coloring code signifying criticality) and/or textual representation (e.g., balloon with expandable textual information indicating the loop, the critical circuit component, reasons for labeling, other information, etc.) In some embodiments where the user interface also includes a design browser listing circuit components, the marking or labeling may also apply to the corresponding circuit components in the design browser.

Figure 3C:
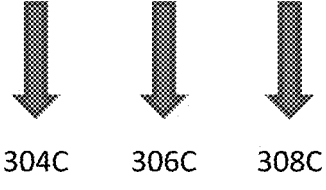
FIG. 3C illustrates an example data structure for interference and disturbance reduction in one or more embodiments.

FIG. 3C illustrates an example data structure for interference and disturbance reduction in one or more embodiments. The example data structure includes multiple data values or multiple pieces of information arranged in columns. For example, a data structure may include the component identifiers (302C), the X-locations (304C), the Y-locations (306C), the Z-locations (308C), one or more attribute columns (310C) listing one or more corresponding attributes or values thereof, and/or one or more function columns listing one or more respective functions or values thereof, etc. in some embodiments. In these embodiments, the X-, Y-, and Z-locations indicate the position (e.g., the origin of an instance of a cell in the multi-fabric layout) of the corresponding circuit component in the multi-fabric electronic design. Also, the data structure may also include the orientation of the circuit component so that the position and the orientation properly determine the spatial relation of the circuit component in the multi-fabric electronic design.

In some other embodiments, rather than the positions and orientations, the data structure may include coordinates of the boundary (e.g., coordinates of the vertices) of a circuit component. Regardless of the types of information included in the data structure, this data structure may be sorted in multiple dimensions. For example, the data structure may be sorted according to the X-locations of circuit components, according to the Y-locations of circuit components, and according to the Z-location of circuit components, although other sorting scheme is also contemplated.

In determining whether any of the circuit components in the data structure are to be considered as critical circuit components, one or more custom queries may be devised based at least in part upon the topology of the identified loop. For example, a database query may be custom defined on the fly to use the X-bound, Y-bound, and/or Z-bound provided by the topology as a part of the predicate or condition of the query. This query may then be executed against the data structure to identify, if any, circuit components whose characteristics (e.g., one or more of 304C-312C) satisfy the predicate or condition.

In some embodiments where one or more filters are applied to the data structure for the determination of critical circuit components, each filter filters out circuit components whose characteristics fail to satisfy the filtering criterion. For example, the X-bound defining the X-axis range of X-coordinate values within which circuit components may be considered critical may filter out circuit components whose X-coordinates are beyond the X-axis range. Similarly, the Y-bound defining the Y-axis range of Y-coordinate values within which circuit components may be considered critical may filter out circuit components whose Y-coordinates are beyond the Y-axis range; and the Z-bound defining the Z-axis range of Z-coordinate values within which circuit components may be considered critical may filter out circuit components whose Z-coordinates are beyond the Z-axis range. With the application of these filters (either sequentially or all at once), any circuit components that satisfy the filtering criteria may be considered as critical circuit components.

In the example illustrated in FIG. 3C, the application of the X-bound determines that "Inductor1," "indcutor2," and "inductor3," may be considered critical; the application of the Y-bound determines that "Inductor3," "antenna1," and "Hi-Freq1," may be considered critical; and the application of the Z-bound determines that "Inductor2" and "indcutor3" may be considered critical. The critical components with respect to the identified loop may thus be identified as the circuit components that satisfy all the filtering criteria. In this example, only "inductor3" satisfies all three filtering criteria and will thus be determined to be critical with respect to the identified loop.

Figure 4A:
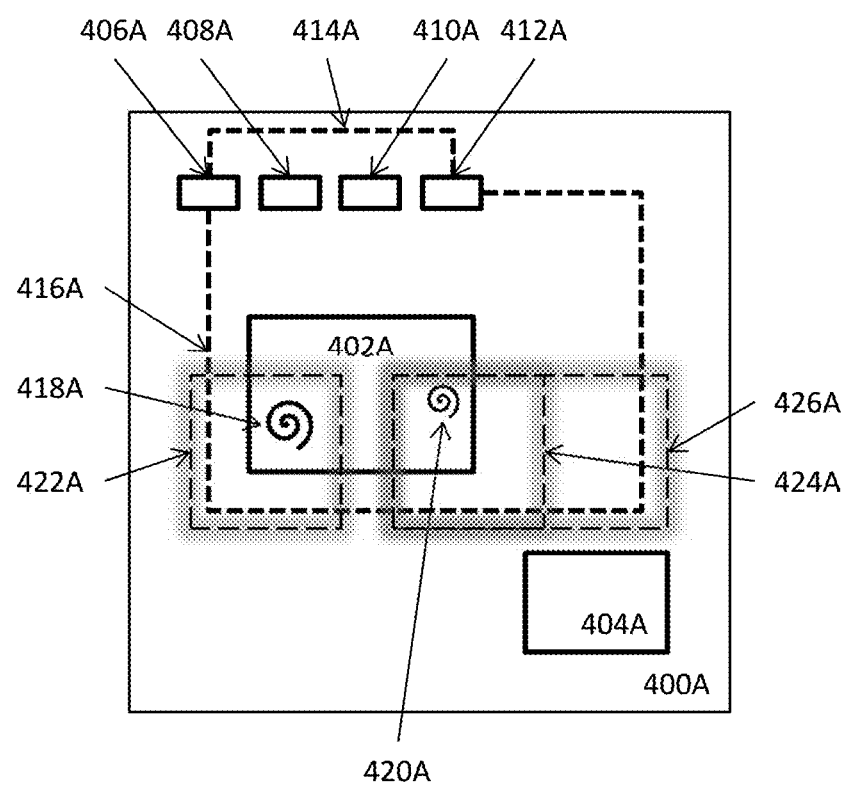
FIG. 4A illustrates an example of a simplified multi-fabric electronic design with the application of interference and disturbance reduction techniques described herein in one or more embodiments.

FIG. 4A illustrates an example of a simplified multi-fabric electronic design with the application of interference and disturbance reduction techniques described herein in one or more embodiments. More specifically, the simplified multi-fabric electronic design 400a includes a first instance 402A, a second instance 404A, and a plurality of discrete circuit components (406A, 408A, 410A, and 412A). For the sole purpose of ease of description and illustration, the simplified multi-fabric electronic design is an IC package layout (or a portion thereof); and the first instance 402A and the second instance 404A are two instances of ICs.

Moreover, the discrete circuit component 406A is connected to the discrete circuit component 412A via interconnect 414A and also via interconnect 416A. The IC instance 402A is represented as abstracted representations having, for example, only the interface elements (e.g., pins of an IC package) but no other design details. The first IC instance 402A is further assumed to include a first inductor 418A and a second inductor 420A, both of which may be susceptible to interferences or disturbances caused by electric current carrying loops. The two interconnects may be created by one or more IC package designers who are unaware of the existence of the two inductors (418A and 420A) in the two IC instances (402A and 404A).

In some embodiments, various techniques for loop detection and critical component determination described herein may be applied to the multi-fabric electronic design illustrated in FIG. 4A and identifies a loop formed by the discrete circuit components 406A and 412A, net 414A, and net 416A. A multi-fabric layout module may open the IC layout database or a data structure such as the one illustrated in FIG. 3C and identify the first inductor 418A and the second inductor 420A as critical circuit components.

In some embodiments, these techniques may either report this identified loop and the two identified critical circuit components to a designer for modifying the electronic design. In some other embodiments, these techniques may carve out a first portion (422A) and/or a second portion (424A or 426A) and extract geometric information of circuit components across multiple design fabrics for further analyses if the criticality of these two critical circuit components may not necessarily arise to the level that requires a design change.

The size and/or shape of a carved out portion may be determined based in part or in whole upon, for example, the susceptibility to interferences or disturbances (e.g., the spatial relation between the loop and a critical circuit component), the range of influence of the identified loop (e.g., the magnitude of the electric current and hence the strength of the electromagnetic field) of the critical circuit components, or any other suitable criteria.

Figure 4B:
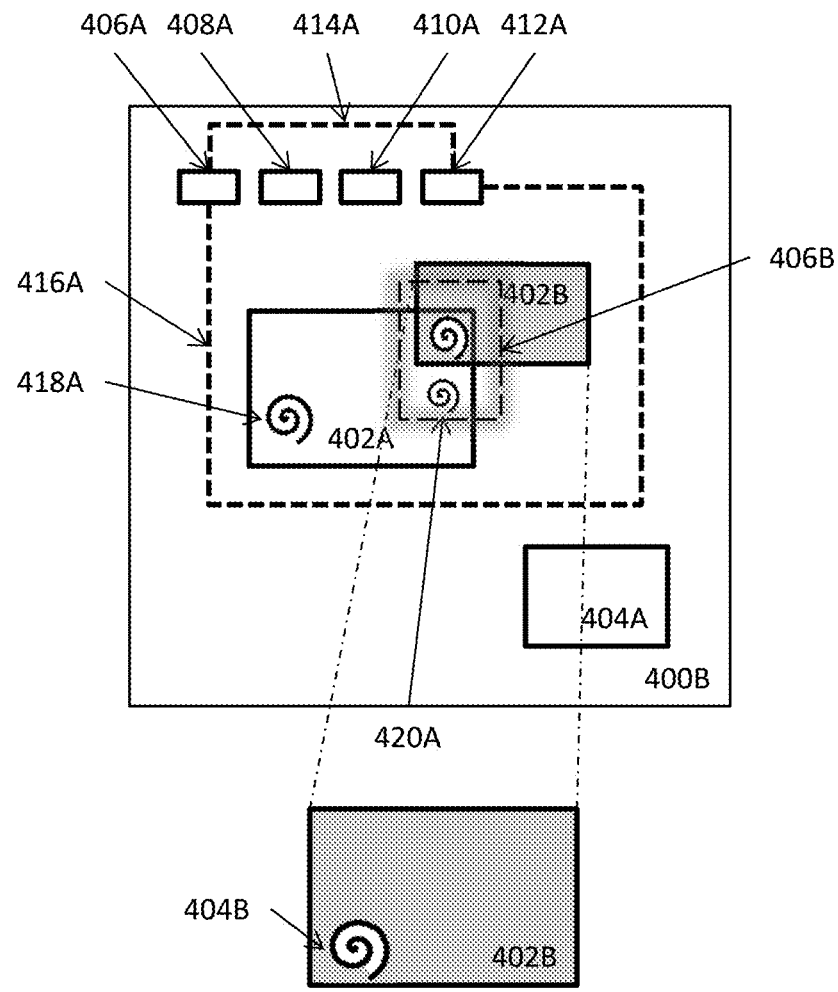
FIG. 4B illustrates another example of a simplified multi-fabric electronic design with the application of interference and disturbance reduction techniques described herein in one or more embodiments.

FIG. 4B illustrates another example of a simplified multi-fabric electronic design with the application of interference and disturbance reduction techniques described herein in one or more embodiments. In this example, an instance of IC 402B is instantiated in the IC package layout 400B that further includes other circuit components as the IC package layout 400A illustrated in FIG. 4A. Furthermore, the designer inserted IC instance 402B onto different layer(s) than the layer(s) on which IC instance 402A is located. By placing the IC instance 402B onto different layer(s), the IC package designer IC may be led to believe that the IC package design 400B exhibit no further issues.

Nonetheless, unknown to the IC package designer, instance 402B includes an inductor 404B; and IC instance 402A includes another inductor 420A. These two inductors (402B and 420A) may be negatively affected by the loop formed by 406A, 412A, 414A, and 416A) as well as the electromagnetic fields created by inductors 404B and 420A due to the close proximity between the two inductors.

These techniques described herein may adopt an identical or similar approach described in FIGS. 2-3B to identify the loop (formed by 406A, 412A, 414A, and 416A) and the critical components (418A, 420A, and 404B). These techniques may either report these circuit components and loop for redesign or may carve out portions of the multi-fabric electronic design for further analyses to more precisely determine the effects of interferences or disturbances. In addition to the portions around each of the three inductors that may be susceptible to the electromagnetic field caused by the current-carrying loop, these techniques may further carve out the portion 406B including inductor 404B and inductor 420A (or at least a portion thereof), obtain the geometric information, and either perform one or more electrical analyses or refer this portion 406B for one or more electrical analyses.

Figure 4C:
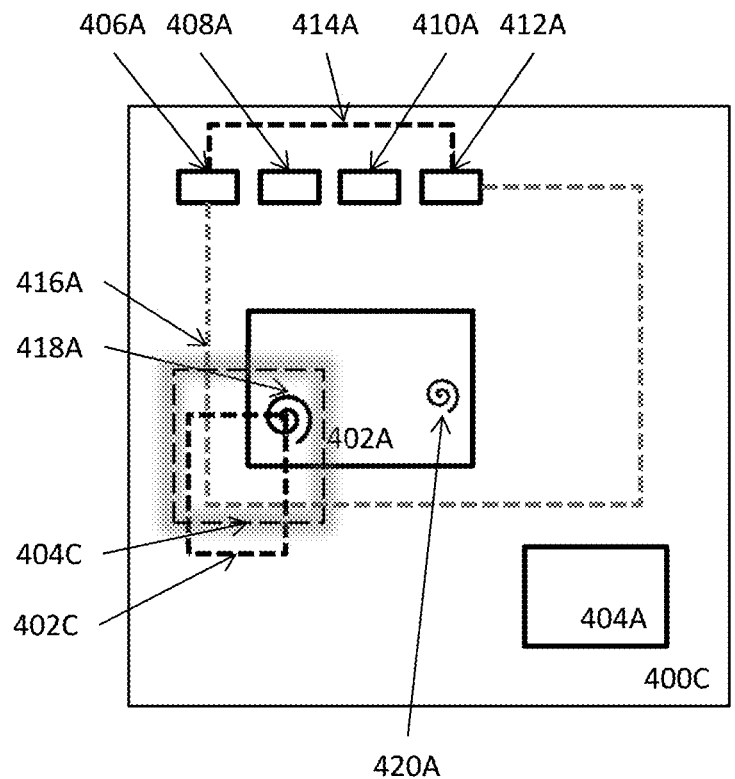
FIG. 4C illustrates another example of a simplified multi-fabric electronic design with the application of interference and disturbance reduction techniques described herein in one or more embodiments.

FIG. 4C illustrates another example of a simplified multi-fabric electronic design with the application of interference and disturbance reduction techniques described herein in one or more embodiments. In this example, the critical circuit component 418A and the loop formed by 406A, 412A, 414A, and 416A may be similarly processed as shown in FIG. 4A and its description. Assuming that the IC package layout 400C further identifies an additional loop 402C that does not fully enclose but overlaps inductor 418A.

In this example, these techniques may further carve out the portion 404C including inductor 418A and at least a portion of the loop, obtain the geometric information thereof, and either perform one or more electrical analyses or refer this portion 402C for one or more electrical analyses such as 3D EM analyses or pseudo-3D EM analyses.

Figure 4D:
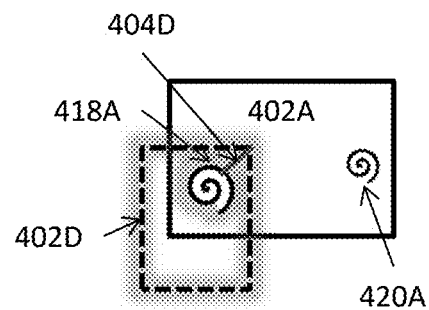
FIGS. 4D-4F illustrates some examples of sources of interferences or disturbances in multi-fabric electronic designs in one or more embodiments.
Figure 4E:
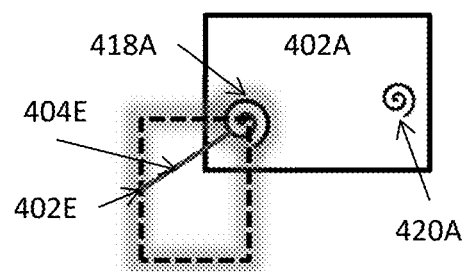
Figure 4F:
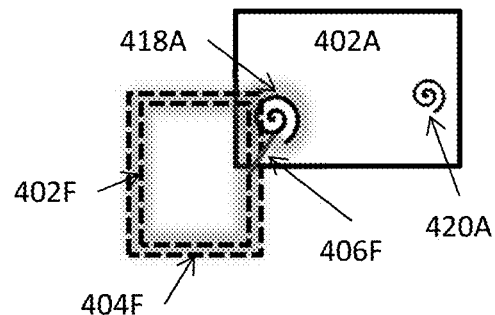

FIGS. 4D-4F illustrates some examples of sources of interferences or disturbances in multi-fabric electronic designs in one or more embodiments. FIG. 4D illustrates an example portion of a multi-fabric electronic design including an instance 402A, and a loop 402D. The instance 402A further includes an inductor 418A that is, in this example, fully enclosed by the loop 402D. Some embodiments will graphically emphasize the loop 402D and the negatively affected circuit component 418A and may further optionally create a link 404D to indicate the association between the lop 402D and the negatively affected circuit component 418A.

FIG. 4E illustrates an example portion of a multi-fabric electronic design including an instance 402A, and a loop 402E. The instance 402A further includes inductor 418A and inductor 420A. Inductor 418A, in this example, overlaps the loop 402E. Some embodiments will graphically emphasize the loop 402E and the negatively affected circuit component 418A and may further optionally create a link 404E to indicate the association between the lop 402E and the negatively affected circuit component 418A.

FIG. 4F illustrates an example portion of a multi-fabric electronic design including an instance 402A, and a loop 402F. The instance 402A further includes inductor 418A and inductor 420A. Loop 402F does not enclose or overlap inductor 418A, in this example. Nonetheless, loop 402F is within some close proximity of inductor 418A. In some embodiments, inductor 418A is not reported as a critical circuit component.

In some other embodiments, these techniques described herein augment the loop by a uniform or non-uniform margin to form an artificial loop 404F and determine whether inductor 418A is a critical circuit component with respect to this artificial loop 404F. If the determination is affirmative, some embodiments will graphically emphasize the loop 402F and the negatively affected circuit component 418A and may further optionally create a link 406F to indicate the association between the loop 402F and the negatively affected circuit component 418A. The margin may be determined, for example, based in part or in whole upon the magnitude of the electric current carried in the loop 402F, the susceptibility of inductor (418A) to interferences and disturbances (e.g., the vertical spacing between the loop 402F or 404F and the inductor 418A), or any other suitable factors.

Figure 4G:
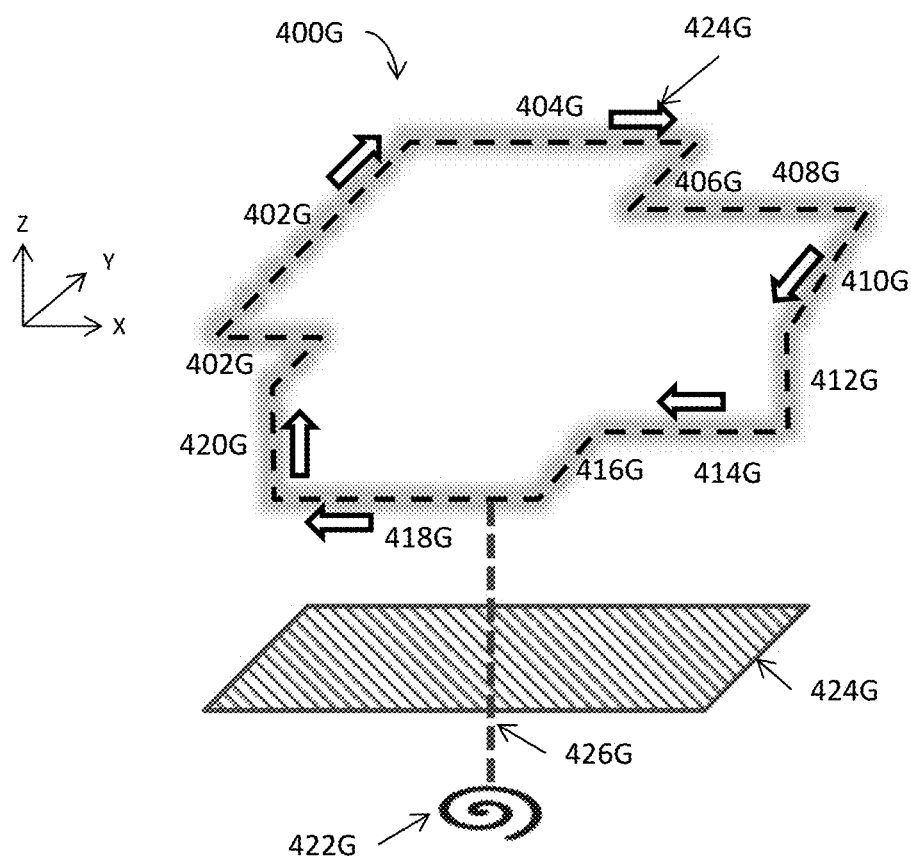
FIG. 4G illustrates an example of excluding a possible source of interferences or disturbances in electronic design from further processing in one or more embodiments.

FIG. 4G illustrates an example of excluding a possible source of interferences or disturbances in electronic design from further processing in one or more embodiments. More specifically, this example illustrates that a loop may be formed not only by circuit components in multiple design fabrics but also by circuit components in different layers of the same design fabric or different design fabrics.

For example, the loop may be formed by net segments (and connected circuit components) 402G, 404G, 406G, 408G, 410G, and 420G, all of which exist on the same upper conductive layer (e.g., metal-5 layer). The loop is also formed by the vertical circuit components (e.g., vias) 420G and 412G that electrically connect two separate conductive layers. The loop is completed by the net segments (and connected circuit components) 414G, 416G, and 418G on the lower conductive layer.

FIG. 4G further illustrates the exclusion of a circuit component, which is generally more susceptible by current-carrying loops, from consideration. In this example, inductor 422 is generally susceptible by current-carrying loops such as the loop illustrated in FIG. 4G. Nonetheless, these techniques may first apply a filtering criterion that filters out circuit components (e.g., inductor 422G) that are separated from the identified loop at a distance 426G by one or more intervening electrically conductive surfaces 424G (e.g., a ground plane or a power plane such as a Vss plane).

This type of filters, like the other filters described herein, may be applied sequentially or all at once with one or more other filters to reduce the search space for the determination of critical circuit components to save computing resources such as processor runtime to search the search space as well as memory utilization for accommodating a smaller search space and for processing circuit components remaining in the search space.

Figure 5:
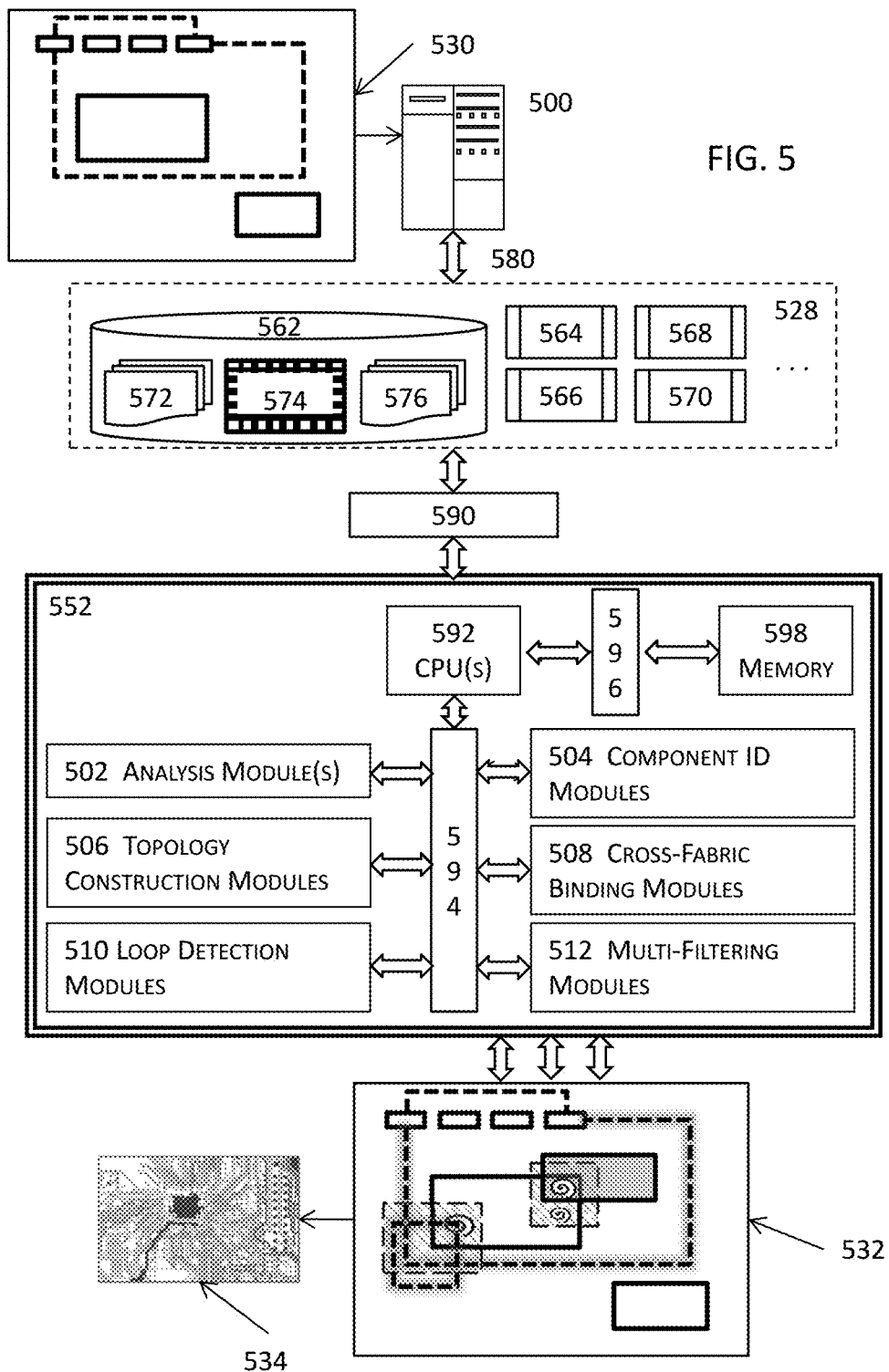
FIG. 5 illustrates an example computing system that performs various interference and disturbance reduction in multi-fabric electronic designs in one or more embodiments.

FIG. 5 illustrates an example computing system that performs various interference and disturbance reduction in multi-fabric electronic designs in one or more embodiments. More specifically, the computing system 500 in FIG. 5 may comprise one or more computing systems 500, such as a general purpose computer described in the System Architecture Overview section to implement one or more special proposes. The illustrative system in FIG. 5 may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 5 may be located in a cloud computing platform in some embodiments.

In this illustrated system in FIG. 5, one or more computing systems 500 may invoke and execute various modules to identify a multi-fabric electronic design 530 (e.g., a layout spanning across the PCB design fabric, the IC package design fabric, the IC design fabric, etc.). These one or more computing systems may further optionally identify, for example, a corresponding schematic design for each design fabric (not shown), a corresponding layout (not shown) for each design fabric, etc. and bind these electronic designs at different abstraction levels (e.g., schematic level, layout level, etc.) in different design fabrics together so that these electronic designs may be cross-referenced with each other. For example, a component in a particular electronic design (e.g., an IC schematic design) can be readily and efficiently identified in the other electronic designs (e.g., the PCB layout, the IC package layout, etc.) with the cross-reference.

The one or more computing systems 500 may invoke and execute a plurality of modules, which are specifically programmed and stored at least partially in memory of and functions in conjunction with at least one microprocessor (e.g., 592) or processor core of the one or more computing system s 500, to perform various functions to transform the identified multi-fabric electronic design 530 into a transformed multi-fabric electronic design 532. For example, the one or more computing systems may identify connectivity of the multi-fabric electronic design and execute a topology construction module (506) to construct the topology of one or more nets and connected circuit components in a single design fabric or across multiple design fabrics. The present invention may then cause the occurrence of manufacturing or fabrication of the underlying electronic circuit 534 at least by forwarding a final version (e.g., a signed-off version) of the electronic design to fabrication equipment (e.g., photomask manufacturing equipment, lithographic equipment, etc.)

This topology may then be provided to a loop detection module (510) that may perform one or more algorithms (e.g., a logical Boolean hole algorithm) to determine the one or more nets and connected circuit components form a loop. Once a loop is identified, the one or more computing systems 500 may further execute a critical component identification module 504 to determine whether one or more circuit components (e.g., inductor(s), circuit component(s) in antenna section(s), high-frequency component(s), etc.) are significantly affected by the identified loop.

With the critical circuit components identified, the one or more computing systems may automatically trigger the appropriate remedial actions. For example, the one or more computing systems may automatically generate and transmit a warning message to a designer's electronic messaging or electronic mail account to indicate that certain critical circuit components are fully enclosed by a loop, and that a design change may be needed. The warning may also include recommendation of design change and more detailed information about the loop, its constituents (e.g., net segments, circuit components, etc. and layers (e.g., metal-5 layer), design fabrics (e.g., PCB, IC package, IC, etc.), etc. that pertains to the net segments, circuit components, etc.)

As another example, the one or more computing systems 500 may carve out a portion of the multi-fabric layout in the vicinity of the loop and a critical circuit component, extract the geometries (across multiple design fabrics if necessary), generate a 3D or pseudo-3D model with at least these geometries, forward the 3D or pseudo-3D model to an analysis module 502 (e.g., a 3D or pseudo-3D electromagnetic simulation module), and performs one or more analyses to more precisely and accurately determine the impact of the identified loop on the critical circuit component. The predicted or determined behavior of the electronic design is then classified according to, for example, its deviation from the corresponding specification and may be provided to a designer for further consideration of whether the electronic design is to be modified.

In some embodiments, the one or more computing systems 500 may invoke various system resources such as the processor(s) or processor core(s), memory, disks, etc. The one or more computing systems 500 may also initiate or interact with other computing systems to access, via a computer bus architecture (e.g., a system bus, a control bus, a data bus, or any combinations thereof), various resources 528 that may comprise a floorplanner, a global routing engine, and/or a detail routing engine 564, a layout editor 566, a design rule checker 568, a verification engine 570, etc. In some embodiments, each design fabric may have its own dedicated, native engines, editors, checkers, etc. mentioned above. In some other embodiments, multiple design fabrics (e.g., an IC package design fabric and an IC design fabric) may use a single unified tool (e.g., a single, unified layout editor) that performs its functions to fulfill the respective needs in these multiple design fabrics.

These various resources 528 may further include, for example, one or more other EDA (electronic design automation) modules such as a schematic tool, a placement tool, a routing tool, verification tools, post-route or post-layout optimization tools, various photolithography tools (e.g., optical proximity correction or OPC tools, phase shift mask or PSM tools, resolution enhancement technology or RET tools, etc.), etc. to prepare the electronic design. Once sign-off and/or design closure is achieved, the electronic design (e.g., a modified version of 530 with reduced interferences and disturbances) is finalized for tapeout; and the electronic design is transmitted to mask fabrication equipment for mask preparation and mask writing to produce photomasks that are then used in the actual manufacturing of the electronic circuits 534 represented by the electronic design.

The one or more computing systems 500 may further write to and read from a local or remote (e.g., networked storage device(s)) non-transitory computer accessible storage 562 that stores thereupon data or information such as, but not limited to, one or more databases (574) such as schematic design database(s) or physical design database(s), electronic circuit design specification database(s), techfiles for multiple design fabrics, various statistics, various data, rule decks, various design rules, constraints, etc. (572), or other information or data (576) that may be used to facilitate the performance of various functions to achieve the intended purposes. The one or more databases may also include, for example, one or more data structures (e.g., the data structure illustrated in FIG. 3C) for facilitating interference and disturbance reduction in multi-fabric electronic designs.

In some embodiments, the one or more computing systems 500 may include or, either directly or indirectly through the various resources 528, invoke a set of modules 552 including hardware modules and software modules or combinations of one or more hardware modules and one or more software modules that may comprises one or more analysis modules 502 that performs various analyses to predict or determine the behavior of a multi-fabric (or a single-fabric) electronic design or a portion thereof, one or more component identification modules 504 that identifies circuit components with respective to a detected loop to determine the criticality of the circuit components. The component identification modules 504 may include one or more query engines that perform various queries against one or more databases or data structures (e.g., query against the critical component identification data structure in FIG. 3C for reduction of interferences and disturbances).

The set of modules 552 may further optionally include one or more topology construction modules 506 to determine the topology of a plurality of net segments and to provide the topology for loop detection. For example, a topology construction module may trace the connectivity of a net to identify and position placer holders for the identified net segments and circuit components in memory to generate the topology (e.g., geometric properties, spatial relations, interrelationships or relative arrangement of circuit components and net segments, etc.) of the net. The set of modules 552 may also include one or more multi-fabric binding modules 508 that bind different electronic designs of the electronic design of interest by creating cross-references between these different electronic designs. For example, a multi-fabric binding module 508 may bind an IC schematic, an IC package schematic, a PCB schematic, an IC layout, an IC package layout, and a PCB layout, etc. together so that the identification of one circuit component can be efficiently and expediently looked up by using the cross-references.

The set of modules 552 may also include one or more loop detection modules 510 that detects loops in a multi-fabric electronic design. A loop detection module 510 is devised and configured in such a way to trace, from a point along a net, in both directions along the net across multiple design fabrics until a terminal point is reached so that any loops formed by net segments and circuit components in multiple design fabrics are correctly and efficiently identified. In addition or in the alternative, this set of modules 552 may include one or more multi-filtering modules 512 to effectively, efficiently reduce the search space of various modules (e.g., a loop detection module 510, a component identification module 504, etc.) in a single stage or multiple stages in order to conserve computational resources (e.g., processor runtime, memory footprint, network bandwidth, etc.)

In some embodiments, the computing system 500 may include the various resources 528 such that these various resources may be invoked from within the computing system via a network or a computer bus 580 (e.g., an internet session, an intranet session, a data bus interfacing a microprocessor 592 and the non-transitory computer accessible storage medium 598 or a system bus 590 between a microprocessor 592 and one or more engines in the various resources 528). In some other embodiments, some or all of these various resources may be located remotely from the computing system 500 such that the computing system may access the some or all of these resources via a computer bus 580 and one or more network components.

The computing system may also include one or more modules in the set of modules 552. One or more modules in the set 552 may include or at least function in conjunction with a microprocessor 592 via a computer bus 594 to access or invoke various modules in 552 (e.g., 502-512 described above) in some embodiments. In these embodiments, a single microprocessor 592 may be included in and thus shared among more than one module even when the computing system 500 includes only one microprocessor 592. A microprocessor 592 may further access some non-transitory memory 598 (e.g., random access memory or RAM) via a system bus 596 to read and/or write data during the microprocessor's execution of processes.

The set of modules 552 may also include one or more extraction modules to identify various data or information such as the schematic connectivity from a schematic design, physical design connectivity from a hierarchical physical design, parasitics from a hierarchical physical design, and/or hierarchy information from a hierarchical schematic design and/or a hierarchical physical design. The set of modules 552 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these multi-fabric signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC fabrication facility that in turn fabricates the requisite photomasks and the eventual electronic circuit.

In some embodiments, the computing system 500 may include the various resources 528 such that these various resources may be invoked from within the computing system via a computer bus 580 (e.g., a data bus interfacing a microprocessor 592 and the non-transitory computer accessible storage medium 598 or a system bus 590 between a microprocessor 592 and one or more engines in the various resources 528). In some other embodiments, some or all of these various resources may be located remotely from the computing system 500 such that the computing system may access the some or all of these resources via a computer bus 580 and one or more network components.

The computing system may also include one or more modules in the set of modules 552. One or more modules in the set 552 may include or at least function in tandem with a microprocessor 592 via a computer bus 594 in some embodiments. In these embodiments, a single microprocessor 592 may be included in and thus shared among more than one module even when the computing system 500 includes only one microprocessor 592. A microprocessor 592 may further access some non-transitory memory 598 (e.g., random access memory or RAM) via a system bus 596 to read and/or write data during the microprocessor's execution of processes.

The one or more computing systems 500 may invoke and execute one or more modules in 528 and/or 552 to perform various functions. Each of these modules may be implemented as a pure hardware implementation (e.g., in the form of firmware, application specific IC, etc.), a pure software implementation, or a combination of hardware and software implementation. In some embodiments where a module is implemented at least partially as a software implementation, the module may be stored at least partially in memory (e.g., in random access memory, instruction cache, etc.) of at least one of these one or more computing systems 500 for execution.

SYSTEM ARCHITECTURE OVERVIEW

Figure 6:
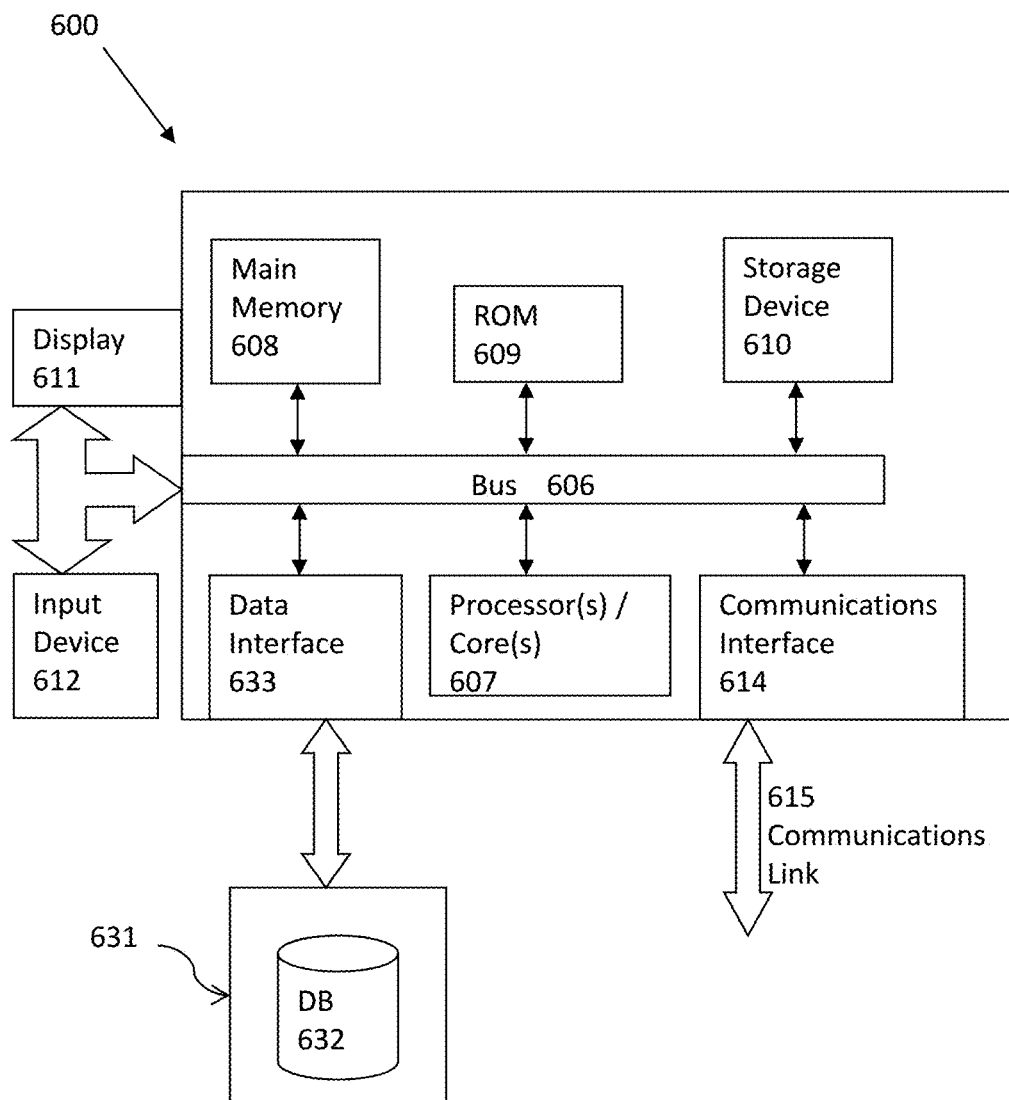
FIG. 6 illustrates a computerized system on which a method for reducing interferences and disturbances in a multi-fabric electronic design may be implemented.

FIG. 6 illustrates a computerized system on which a method for reducing interferences and disturbances in a multi-fabric electronic design may be implemented. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown). The illustrative computing system 600 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 600 may include or may be a part of a cloud computing platform in some embodiments.

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program (e.g., application code) through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633. A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for reducing interferences and disturbances in a multi-fabric electronic design, comprising:

identifying connectivity for an electronic design that includes design data in multiple design fabrics;

detecting, by one or more interference reduction modules stored at least partially in memory of and functioning in conjunction with at least one microprocessor of a computing system, a loop in the electronic design with at least the connectivity, wherein detecting the loop in the electronic design comprises:

projecting one or more circuit components in two or more design fabrics of the multiple design fabrics onto a same level to form one or more projected circuit components; and determining whether one or more projected circuit components form the loop;

determining, by the one or more interference reduction modules, at least one critical circuit component upon which the loop exerts a negative impact based at least in part upon a determination of whether the loop encloses, overlaps, or is within a customizable proximity threshold value of the at least one critical component; and triggering one or more remedial actions that reduce or eliminate the negative impact on the critical circuit component design.

2. The computer implemented method of claim 1, wherein detecting the loop comprises:

determining whether the loop, when energized, exert with a neighboring circuit component based at least in part upon a type of the loop, an electrical characteristic of the neighboring circuit component, and an interface type of an interface to which the neighboring circuit component belongs.

3. The computer implemented method of claim 1, wherein detecting the loop comprises:

identifying a net of a plurality of nets in the electronic design with at least the connectivity;

identifying one or more additional circuit components connected to the net; and determining topology information of the net at least by using the design data of the net and the one or more additional circuit components.

4. The computer implemented method of claim 3, wherein determining the topology information comprises:

identifying geometric or location data from the design data of the design data of the net and the one or more additional circuit components; and determining spatial relations among the net and the one or more additional circuit components.

5. The computer implemented method of claim 4, wherein detecting the loop comprises:

determining whether the topology indicates existence of the loop by performing one or more logical operations on one or more net segments of the net and the one or more additional circuit components; and upon a determination of the existence of the loop, determining a type of the loop, wherein types of loops include electrically closed, electrically open with a gap smaller than a threshold value, and electrically open with the gap larger than the threshold value.

6. The computer implemented method of claim 5, wherein determining the at least one critical component comprises:

identifying or generating a data structure for one or more types of circuit components; and identifying one or more first circuit components in the electronic design based at least in part upon the topology information.

7. The computer implemented method of claim 6, wherein determining the at least one critical component comprises:

pre-filtering the data structure by using one or more pre-filters based in part or in whole upon the topology information.

8. The computer implemented method of claim 7, wherein determining the at least one critical component comprises:

determining a criticality index of a first circuit component of the one or more first circuit components based at least in part upon a relationship between the first circuit component and the loop.

9. The computer implemented method of claim 8, wherein determining the at least one critical component comprises:

determining whether the first circuit component is classified as the at least one critical circuit component based at least in part upon the critical index.

10. The computer implemented method of claim 9, wherein determining the at least one critical component comprises:

labeling the at least one critical circuit component with a marker based at least in part upon the criticality index and the relationship between the first circuit component and the loop.

11. A system for reducing interferences and disturbances in a multi-fabric electronic design, comprising:

non-transitory computer accessible storage medium storing thereupon program code;

one or more interference reduction modules stored at least partially in memory of and functioning in conjunction with at least one microprocessor of one or more computing system, wherein the at least one microprocessor of the one or more computing systems is configured to execute at least the one or more interference reduction modules at least to:

identify connectivity for an electronic design that includes design data in multiple design fabrics;

detect a loop in the electronic design with at least the connectivity, wherein the at least one processor that is configured to detect the loop in the electronic design is further configured to:

projecting one or more circuit components in two or more design fabrics of the multiple design fabrics onto a same level to form one or more projected circuit components; and determining whether one or more projected circuit components form the loop;

determine at least one critical circuit component upon which the loop exerts a negative impact based at least in part upon a determination of whether the loop encloses, overlaps, or is within a customizable proximity threshold value of the at least one critical component; and trigger one or more remedial actions that reduce or eliminate the negative impact on the critical circuit component design.

12. The system for claim 11, wherein the at least one micro-processor that is configured to execute at least the one or more interference reduction modules is further configured to:

determine whether the loop, when energized, exert with a neighboring circuit component based at least in part upon a type of the loop, an electrical characteristic of the neighboring circuit component, and an interface type of an interface to which the neighboring circuit component belongs.

13. The system for claim 11, wherein the at least one micro-processor that is configured to execute at least the one or more interference reduction modules is further configured to:

identify a net of a plurality of nets in the electronic design with at least the connectivity;

identify one or more additional circuit components connected to the net;

determine topology information of the net at least by using the design data of the net and the one or more additional circuit components;

identifying geometric or location data from the design data of the design data of the net and the one or more additional circuit components;

determining spatial relations among the net and the one or more additional circuit components;

determining whether the topology indicates existence of the loop by performing one or more logical operations on one or more net segments of the net and the one or more additional circuit components; and upon a determination of the existence of the loop, determining a type of the loop, wherein types of loops include electrically closed, electrically open with a gap smaller than a threshold value, and electrically open with the gap larger than the threshold value.

14. The system for claim 13, wherein the at least one micro-processor that is configured to execute at least the one or more interference reduction modules is further configured to:

identify or generate a data structure for one or more types of circuit components;

identify one or more first circuit components in the electronic design based at least in part upon the topology information; and pre-filter the data structure by using one or more pre-filters based in part or in whole upon the topology information.

15. The system for claim 14, wherein the at least one micro-processor that is configured to execute at least the one or more interference reduction modules is further configured to:

determine a criticality index of a first circuit component of the one or more first circuit components based at least in part upon a relationship between the first circuit component and the loop;

determine whether the first circuit component is classified as the at least one critical circuit component based at least in part upon the critical index; and label the at least one critical circuit component with a marker based at least in part upon the criticality index and the relationship between the first circuit component and the loop.

16. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for reducing interferences and disturbances in a multi-fabric electronic design, the set of acts comprising:

identifying connectivity for an electronic design that includes design data in multiple design fabrics;

detecting, by one or more interference reduction modules stored at least partially in memory of and functioning in conjunction with at least one microprocessor of a computing system, a loop in the electronic design with at least the connectivity, wherein detecting the loop in the electronic design comprises:

projecting one or more circuit components in two or more design fabrics of the multiple design fabrics onto a same level to form one or more projected circuit components; and determining whether one or more projected circuit components form the loop;

determining, by the one or more interference reduction modules, at least one critical circuit component upon which the loop exerts a negative impact based at least in part upon a determination of whether the loop encloses, overlaps, or is within a customizable proximity threshold value of the at least one critical component; and triggering one or more remedial actions that reduce or eliminate the negative impact on the critical circuit component design.

17. The article of manufacture of claim 16, the set of acts further comprising:

determining whether the loop, when energized, exert with a neighboring circuit component based at least in part upon a type of the loop, an electrical characteristic of the neighboring circuit component, and an interface type of an interface to which the neighboring circuit component belongs.

18. The article of manufacture of claim 16, the set of acts further comprising:

identifying a net of a plurality of nets in the electronic design with at least the connectivity;

identifying one or more additional circuit components connected to the net; and determining topology information of the net at least by using the design data of the net and the one or more additional circuit components, identifying geometric or location data from the design data of the design data of the net and the one or more additional circuit components;

determining spatial relations among the net and the one or more additional circuit components;

determining whether the topology indicates existence of the loop by performing one or more logical operations on one or more net segments of the net and the one or more additional circuit components; and upon a determination of the existence of the loop, determining a type of the loop, wherein types of loops include electrically closed, electrically open with a gap smaller than a threshold value, and electrically open with the gap larger than the threshold value.

19. The article of manufacture of claim 18, the set of acts further comprising:

identifying or generating a data structure for one or more types of circuit components;

identifying one or more first circuit components in the electronic design based at least in part upon the topology information; and pre-filtering the data structure by using one or more pre-filters based in part or in whole upon the topology information.

20. The article of manufacture of claim 19, the set of acts further comprising:

determining a criticality index of a first circuit component of the one or more first circuit components based at least in part upon a relationship between the first circuit component and the loop;

determining whether the first circuit component is classified as the at least one critical circuit component based at least in part upon the critical index; and labeling the at least one critical circuit component with a marker based at least in part upon the criticality index and the relationship between the first circuit component and the loop.

* * * * *